United States Patent
Williams

(10) Patent No.: US 7,305,579 B2
(45) Date of Patent: Dec. 4, 2007

(54) METHOD, APPARATUS AND PROGRAM STORAGE DEVICE FOR PROVIDING INTELLIGENT REBUILD ORDER SELECTION

(75) Inventor: Jeffrey L. Williams, Rochester, MN (US)

(73) Assignee: Xiotech Corporation, Eden Prairie, MN (US)

( * ) Notice: Subject to any disclaimer, the term of this patent is extended or adjusted under 35 U.S.C. 154(b) by 217 days.

(21) Appl. No.: 11/086,077

(22) Filed: Mar. 22, 2005

(65) Prior Publication Data

US 2006/0218433 A1    Sep. 28, 2006

(51) Int. Cl.
    *G06F 11/00* (2006.01)
(52) U.S. Cl. .............................. 714/7; 714/8
(58) Field of Classification Search ............ 714/7, 714/8
    See application file for complete search history.

(56) References Cited

U.S. PATENT DOCUMENTS

| | | | |
|---|---|---|---|
| 6,516,425 B1* | 2/2003 | Belhadj et al. | 714/6 |
| 2005/0257083 A1* | 11/2005 | Cousins | 714/6 |
| 2006/0107102 A1* | 5/2006 | Nagin et al. | 714/7 |

\* cited by examiner

*Primary Examiner*—Bryce P Bonzo
(74) *Attorney, Agent, or Firm*—Beck + Tysver, P.L.L.C.

(57) ABSTRACT

A method, apparatus and program storage device for providing intelligent rebuild order selection is a storage array is disclosed. The interrelationship of the data on the drives to be rebuilt and the remaining drives in the system is examined. A relative score for a rebuild record to be rebuilt is based upon the manner in which the RAID data is placed on the other drives. The rebuild record with the highest relative risk is identified as the rebuild record to be rebuilt next.

11 Claims, 4 Drawing Sheets

RAID A (R5/P5)

| Drive 0 | Drive 1 | Drive 2 | Drive 3 | Drive 4 | Drive 5 | Drive 6 | Drive 7 | Drive 8 | Drive 9 | Drive 10 |
|---|---|---|---|---|---|---|---|---|---|---|
| Stripe A | Stripe A | Stripe A | Stripe A | Stripe A | Stripe B | Stripe B | Stripe B | Stripe B | Stripe B | Stripe C |
| Stripe C | Stripe C | Stripe C | Stripe C | Stripe D | Stripe D | Stripe D | Stripe D | Stripe D | Stripe E | Stripe E |
| Stripe E | Stripe E | Stripe E | Stripe F | Stripe F | Stripe F | Stripe F | Stripe F | Stripe G | Stripe G | Stripe G |
| Stripe G | Stripe G | Stripe H | Stripe H | Stripe H | Stripe H | Stripe H | Stripe I | Stripe I | Stripe I | Stripe I |
| Stripe I | Stripe J | Stripe J | Stripe J | Stripe J | Stripe J | Stripe K | Stripe K | Stripe K | Stripe K | Stripe K |

Fig. 4

RAID B (R10/depth 2)

| Drive 1 | Drive 2 | Drive 3 | Drive 4 | Drive 5 | Drive 6 | Drive 7 | Drive 8 | Drive 9 |
|---|---|---|---|---|---|---|---|---|
| Stripe A | Stripe B | Stripe B | Stripe C | Stripe C | Stripe D | Stripe D | Stripe E | Stripe E |

Fig. 5

RAID C (R10/depth 2)

| Drive 0 | Drive 1 | Drive 2 | Drive 3 | Drive 4 | Drive 5 | Drive 6 | Drive 7 | Drive 8 | Drive 9 | Drive 10 |
|---|---|---|---|---|---|---|---|---|---|---|
| Stripe A | Stripe A | Stripe B | Stripe B | Stripe C | Stripe C | Stripe D | Stripe D | Stripe E | Stripe E | Stripe F |
| Stripe F | Stripe G | Stripe G | Stripe H | Stripe H | Stripe I | Stripe I | Stripe J | Stripe J | Stripe K | Stripe K |

Fig. 6

METHOD, APPARATUS AND PROGRAM STORAGE DEVICE FOR PROVIDING INTELLIGENT REBUILD ORDER SELECTION

BACKGROUND OF THE INVENTION

1. Field of the Invention

This invention relates in general to storage systems, and more particularly to a method, apparatus and program storage device for providing intelligent rebuild order selection is a storage array.

2. Description of Related Art

Computer systems are constantly improving in terms of speed, reliability, and processing capability. As a result, computers are able to handle more complex and sophisticated applications. As computers improve, performance demands placed on mass storage and input/output (I/O) devices increase. There is a continuing need to design mass storage systems that keep pace in terms of performance with evolving computer systems.

A Disk array data storage system has multiple storage disk drive devices, which are arranged and coordinated to form a single mass storage system. There are three primary design criteria for mass storage systems: cost, performance, and availability. It is most desirable to produce memory devices that have a low cost per megabyte, a high input/output performance, and high data availability. "Availability" is the ability to access data stored in the storage system and the ability to insure continued operation in the event of some failure. Typically, data availability is provided through the use of redundancy wherein data, or relationships among data, are stored in multiple locations.

There are two common methods of storing redundant data. According to the first or "mirror" method, data is duplicated and stored in two separate areas of the storage system. For example, in a disk array, the identical data is provided on two separate disks in the disk array. The mirror method has the advantages of high performance and high data availability due to the duplex storing technique. However, the mirror method is also relatively expensive as it effectively doubles the cost of storing data.

In the second or "parity" method, a portion of the storage area is used to store redundant data, but the size of the redundant storage area is less than the storage space used to store the original data. For example, in a disk array having five disks, four disks might be used to store data with the fifth disk being dedicated to storing redundant data. The parity method is advantageous because it is less costly than the mirror method, but it also has lower performance and availability characteristics in comparison to the mirror method.

In a virtual storage system, both the Mirror and the Parity method have the same usage costs in terms of disk space overhead as they do in a non-virtual storage system, but the granularity is such that each physical disk drive in the system can have one or more RAID arrays striped on it as well as both Mirror and Parity methods simultaneously. As such, a single physical disk drive may have data segments of some virtual disks on it as well as parity segments of other physical disks and both data and mirrored segments of other virtual disks.

These two redundant storage methods provide automated recovery from many common failures within the storage subsystem itself due to the use of data redundancy, error codes, and so-called "hot spares" (extra storage modules which may be activated to replace a failed, previously active storage module). These subsystems are typically referred to as redundant arrays of inexpensive (or independent) disks (or more commonly by the acronym RAID). The 1987 publication by David A. Patterson, et al., from University of California at Berkeley entitled A Case for Redundant Arrays of Inexpensive Disks (RAID), reviews the fundamental concepts of RAID technology.

There are five "levels" of standard geometries defined in the Patterson publication. The simplest array, a RAID 1 system, comprises one or more disks for storing data and a number of additional "mirror" disks for storing copies of the information written to the data disks. The remaining RAID levels, identified as RAID 2, 3, 4 and 5 systems, segment the data into portions for storage across several data disks. One of more additional disks are utilized to store error check or parity information. Additional RAID levels have since been developed. For example, RAID 6 is RAID 5 with double parity (or "P+Q Redundancy"). Thus, RAID 6 is an extension of RAID 5 that uses a second independent distributed parity scheme. Data is striped on a block level across a set of drives, and then a second set of parity is calculated and written across all of the drives. This configuration provides extremely high fault tolerance and can sustain several simultaneous drive failures, but it requires an "n+2" number of drives and a very complicated controller design. RAID 10 is a combination of RAID 1 and RAID 0. RAID 10 combines RAID 0 and RAID 1 by striping data across multiple drives without parity, and it mirrors the entire array to a second set of drives. This process delivers fast data access (like RAID 0) and single drive fault tolerance (like RAID 1), but cuts the usable drive space in half. RAID 10, which requires a minimum of four equally sized drives in a non-virtual disk environment and 3 drives of any size in a virtual disk storage system, is the most expensive RAID solution and offers limited scalability in a non-virtual disk environment.

A computing system typically does not require knowledge of the number of storage devices that are being utilized to store the data because another device, the storage subsystem controller, is utilized to control the transfer of data to and from the computing system to the storage devices. The storage subsystem controller and the storage devices are typically called a storage subsystem and the computing system is usually called the host because the computing system initiates requests for data from the storage devices. The storage controller directs data traffic from the host system to one or more non-volatile storage devices. The storage controller may or may not have an intermediate cache to stage data between the non-volatile storage device and the host system.

In a computer system employing the drive array, it is desirable that the drive array remains on-line should a physical drive of the drive array fail. If a main physical drive should fail, drive arrays currently have the capability of allowing a spare physical replacement drive to be rebuilt without having to take the entire drive array off-line. Furthermore, intelligent drive array subsystems currently exist which can rebuild the replacement drive transparent to the computer system and while the drive array is still otherwise operational.

When a disk in a RAID redundancy group fails, the array attempts to rebuild data on the surviving disks of the redundancy group (assuming space is available) in such a way that after the rebuild is finished, the redundancy group can once again withstand a disk failure without data loss. Depending upon system design, the rebuild may be automated or may require user input.

After detecting a disk or component failure and during a rebuild of data, regardless of rebuild design, the system remains subject to yet further disk or component failures before the rebuild is complete. In any RAID system, this is significant because the vulnerability of data loss is dependent upon the RAID architecture.

When multiple disk drives require a rebuild of their data from redundant drives, it is possible that another drive containing the redundant data can be lost during the rebuild causing the loss of user data. The risk of losing data when a subsequent drive is lost is related to the manner in which the redundant data is arranged on the drives. Each drive and each RAID on the drive being rebuilt will have a different risk associated with the loss of another drive.

It can be seen then that there is a need for a method, apparatus and program storage device for providing intelligent rebuild order selection is a storage array.

SUMMARY OF THE INVENTION

To overcome the limitations in the prior art described above, and to overcome other limitations that will become apparent upon reading and understanding the present specification, the present invention discloses a method, apparatus and program storage device for providing intelligent rebuild order selection is a storage array.

The present invention solves the above-described problems by examining the interrelationship of the data on the drives to be rebuilt and the remaining drives. A relative score for a rebuild record is based upon the manner in which the RAID data is placed on the other drives. The rebuild record with the highest relative risk is identified as the rebuild record to be rebuilt next.

A method in accordance with the present invention includes examining the interrelationship of data on drives to be rebuilt and any other remaining drives in the system, calculating a relative score for each rebuild record to be rebuilt based upon the manner in which the RAID devices are placed on the other remaining drives, identifying as the rebuild record to be rebuilt next a drive with a highest relative risk based upon the calculated relative risk score for each rebuild record and rebuilding the drive having the highest relative risk.

In another embodiment of the present invention, a storage system device is provided. The storage system device includes a processor and a plurality of storage devices, wherein the processor is configured for examining the interrelationship of data on storage devices to be rebuilt and any other remaining storage devices in the system, calculating a relative score for each rebuild record to be rebuilt based upon the manner in which the RAID storage devices are placed on the other remaining storage devices, identifying as the rebuild record to be rebuilt next a rebuild record with a highest relative risk based upon the calculated relative risk score for each rebuild record and rebuilding the rebuild record having the highest relative risk.

In another embodiment of the present invention, a program storage device including program instructions executable by a processing device to perform operations for providing a closed-loop storage system is provided. The operations provided by the program storage device include examining the interrelationship of data on drives to be rebuilt and any other remaining drives in the system, calculating a relative score for each rebuild record to be rebuilt based upon the manner in which the RAID devices are placed on the other remaining drives, identifying as the rebuild record to be rebuilt next a rebuild record with a highest relative risk based upon the calculated relative risk score for each rebuild record and rebuilding the rebuild record having the highest relative risk.

In another embodiment of the present invention, another storage system device is provided. This storage system device includes means for processing data and a plurality of means for storing data, wherein the means for processing data is configured for examining the interrelationship of data on the plurality of means for storing data to be rebuilt and any other remaining means for storing data in the system, calculating a relative score for each means for storing data to be rebuilt based upon the manner in which RAID data are placed on the other remaining means for storing data, identifying as the means for storing data to be rebuilt next means for storing data with a highest relative risk based upon the calculated relative risk score for each means for storing data and rebuilding the means for storing data having the highest relative risk.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 4 illustrates the calculation of risk and intelligent rebuild order selection according to an embodiment of the present invention;

FIG. 5 illustrates the calculation of risk and intelligent rebuild order selection according to another embodiment of the present invention; and FIG. 6 illustrates the calculation of risk and intelligent rebuild order selection according to yet another embodiment of the present invention.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method, apparatus and program storage device for providing intelligent rebuild order selection is a storage array. The interrelationship of the data on the drives to be rebuilt and the remaining drives in the system is examined. A relative score for a drive to be rebuilt is based upon the manner in which the RAID data is placed on the other drives. The rebuild record with the highest relative risk is identified as the rebuild record to be rebuilt next.

Figure 1:
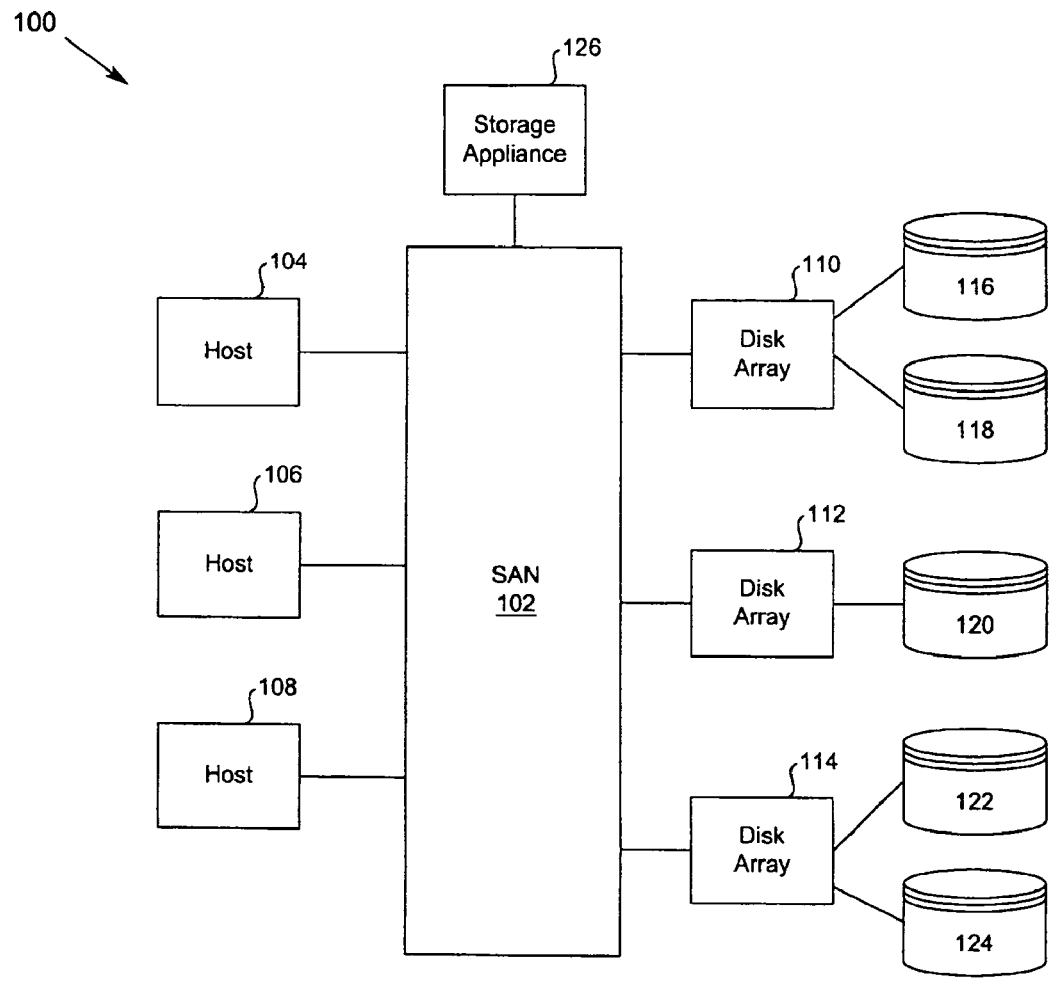
FIG. 1 illustrates a storage area network.

FIG. 1 illustrates a storage area network 100. A storage-area network is a high-speed network for interconnecting different kinds of storage devices such as tape libraries and disk arrays. These devices can be shared by all users (regardless of location or operating systems) through network servers. In FIG. 1, a storage area network 102 provides a set of hosts (e.g., servers or workstations) 104, 106, 108 that may be coupled to a pool of storage devices (e.g., disks). In SCSI parlance, the hosts may be viewed as "initiators" and the storage devices may be viewed as "targets." A storage pool may be implemented, for example, through a set of storage arrays or disk arrays 110, 112, 114. Each disk array 110, 112, 114 further correspond to a set of disks. In this example, first disk array 110 corresponds to disks 116, 118, second disk array 112 corresponds to disk 120, and third disk array 114 corresponds to disks 122, 124. Rather than enabling all hosts 104-108 to access all disks 116-124, it is desirable to enable the dynamic and invisible allocation of storage (e.g., disks) to each of the hosts 104-108 via the disk arrays 110, 112, 114. In other words, physical memory (e.g., physical disks) may be allocated through the concept of virtual memory (e.g., virtual disks). This allows one to connect heterogeneous initiators to a distributed, heterogeneous set of targets (storage pool) in a manner enabling the dynamic and transparent allocation of storage.

The concept of virtual memory has traditionally been used to enable physical memory to be virtualized through the translation between physical addresses in physical memory and virtual addresses in virtual memory. Recently, the concept of "virtualization" has been implemented in storage area networks through various mechanisms. Virtualization converts physical storage to virtual storage on a storage network. The hosts (initiators) see virtual disks as targets. The virtual disks represent available physical storage in a defined but somewhat flexible manner. Virtualization provides hosts with a representation of available physical storage that is not constrained by certain physical arrangements/allocation of the storage.

One early technique, Redundant Array of Independent Disks (RAID), provides some limited features of virtualization. Various RAID subtypes have been implemented. In RAID 1, a virtual disk may correspond to two physical disks 116, 118 which both store the same data (or otherwise support recovery of the same data), thereby enabling redundancy to be supported within a storage area network. In RAID 0, a single virtual disk is striped across multiple physical disks. Some other types of virtualization include concatenation, sparing, etc. Some aspects of virtualization have recently been achieved through implementing the virtualization function in various locations within the storage area network. Three such locations have gained some level of acceptance: virtualization in the hosts (e.g., 104-108), virtualization in the disk arrays or storage arrays (e.g., 110-114), and virtualization in a storage appliance 126 separate from the hosts and storage pool. Unfortunately, each of these implementation schemes has undesirable performance limitations.

Virtualization in the storage array is one of the most common storage virtualization solutions in use today. Through this approach, virtual volumes are created over the storage space of a specific storage subsystem (e.g., disk array). Creating virtual volumes at the storage subsystem level provides host independence, since virtualization of the storage pool is invisible to the hosts. In addition, virtualization at the storage system level enables optimization of memory access and therefore high performance. However, such a virtualization scheme typically will allow a uniform management structure only for a homogenous storage environment and even then only with limited flexibility. Further, since virtualization is performed at the storage subsystem level, the physical-virtual limitations set at the storage subsystem level are imposed on all hosts in the storage area network. Moreover, each storage subsystem (or disk array) is managed independently. Virtualization at the storage level therefore rarely allows a virtual volume to span over multiple storage subsystems (e.g., disk arrays), thus limiting the scalability of the storage-based approach.

Figure 2:
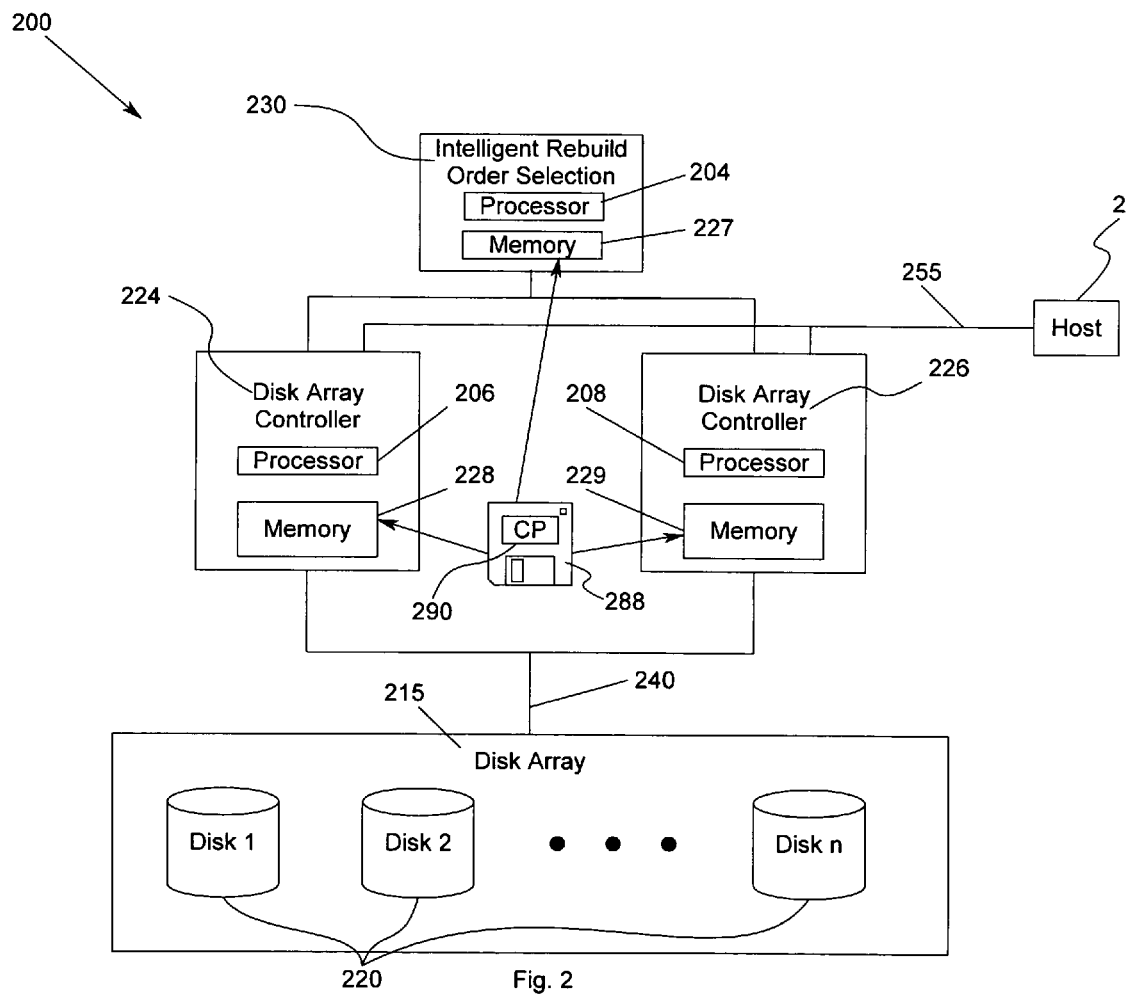
FIG. 2 is a block diagram of a hierarchical RAID data storage system employing one embodiment of the present invention.

FIG. 2 is a block diagram of a hierarchical RAID data storage system 200 employing one embodiment of the present invention. The data storage system 200 includes a disk array 215 having a plurality of storage disks 220, disk array controllers 224, 226 coupled to the disk array 215 to coordinate data transfer to and from the storage disks 220. Array controllers 224, 226 controls data storage and the hierarchical RAID levels (redundancy schemes) in the array 215, and control the transferring of data among the various hierarchical redundancy schemes. An intelligent rebuild order selection device 230 is provided according to the present invention. Specifically, in the event of a disk or component failure for any storage disk 220, the intelligent rebuild order selection device 230 minimizes potential data loss by prioritizing the rebuild according to risk associated with the loss of another drive. While the intelligent rebuild order selection device 230 is shown separate from the disk array controllers 224, 226, those skilled in the art will recognize that the intelligent rebuild order selection device 230 may be a part of the disk array controllers 224, 226, a RAID management system (not shown), etc.

For purposes of this disclosure, a "disk" is any non-volatile, randomly accessible, rewritable mass storage device. It includes both rotating magnetic and optical disks and solid-state disks, and non-volatile electronic storage elements (such as PROMs, EPROMs, and EEPROMs). The term "disk array" is a collection of disks, the hardware required to connect them to one or more host computers, and management software used to control the operation of the physical disks and present them as one or more virtual disks to the host operating environment. A "virtual disk" is an abstract entity realized in the disk array by the management software. A "storage device failure" or "disk failure" is defined to include any aspect, aspects, event or events of the system 200 or components thereof that causes any one or more of the disks 220 to be inaccessible, or data on any one or more of the disks 220 to be inaccessible. Exemplary disk failures include, an actual failure of a physical disk 220 itself, a system or component failure that affects read or write access to a disk 220, an event or combination of events that cause a disk 220 to be inaccessible, or even a removal of a disk 220 from the array 215. An "array" is defined to include, in context, a set or a subset of storage devices.

The disk array controllers 224, 226 are coupled to the disk array 215 via one or more interface buses 240, such as a small computer system interface (SCSI). The intelligent rebuild order selection device 230 is operatively coupled to the disk array controllers 224, 226. In the system shown, disk array controllers 224, 226 are implemented as a dual controller consisting of disk array controller 224 and disk array controller 226. Dual controllers 224, 226 enhance reliability by providing continuous backup and redundancy in the event that one controller becomes inoperable. However, the present invention can be practiced with more than two controllers, a single controller or other architectures.

In a one embodiment, the intelligent rebuild order selection device 230 may be configured as firmware within a memory 228, 229 of the disk array controllers 224, 226. The intelligent rebuild order selection device 230 includes executable instructions, routines, tables and/or other data and data structures necessary for managing the controllers 224, 226 and array 215, including rebuilding data after a disk failure, and for prioritizing and/or managing the order or sequence of rebuild under the present invention as will be discussed more fully herein. Again, the intelligent rebuild order selection device 230 is shown as separate from the controllers 224, 226 simply for clarity of depiction and descriptions purposes. Alternatively, the intelligent rebuild order selection device 230 may be embodied as a separate component (as shown), either as firmware or software, or configured within a memory of a host computer 250, i.e., a processor on the hierarchical RAID data storage system. Alternatively, these systems may be embodied in hardwired circuitry (such as an ASIC). The data storage system 200 is coupled to the host computer 250 via an I/O interface bus 255.

Figure 3:
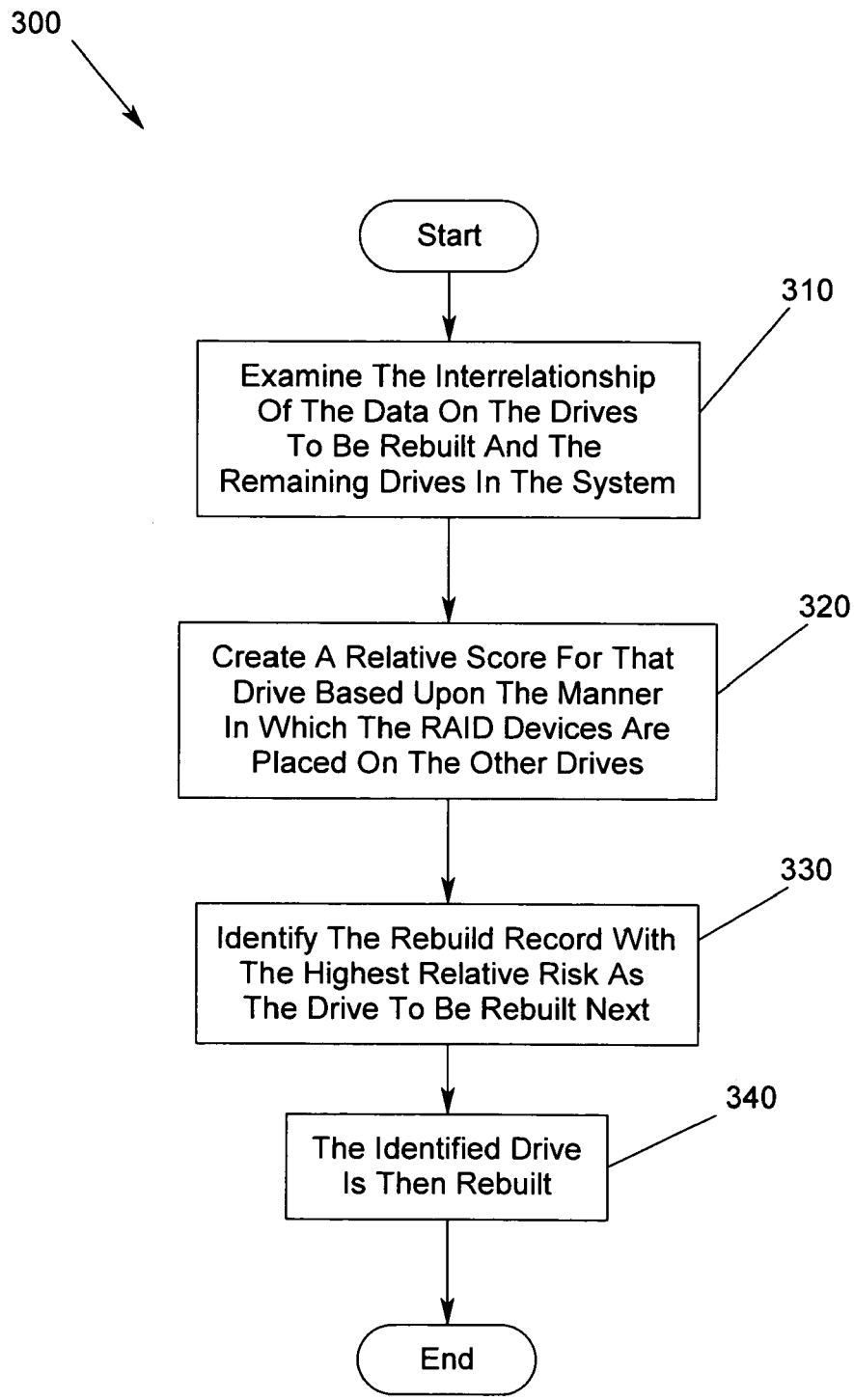
FIG. 3 illustrates a flow chart of a method for providing intelligent rebuild order selection is a storage array according to an embodiment of the present invention.

FIG. 3 illustrates a flow chart 300 of a method for providing intelligent rebuild order selection is a storage array according to an embodiment of the present invention. In the past, one drive at a time was rebuilt without regard to the relative risk associated with other drives to be rebuilt. According to an embodiment of the present invention, the intelligent rebuild order selection device examines the interrelationship of the data on the drives to be rebuilt and the remaining drives in the system 310.

Currently, when a drive is presented for a rebuild operation, one record (rebuild record) is placed onto a list for each RAID device contained on that drive that requires a rebuild. This may result in a list of rebuild records that are processed purely in a FIFO order and ignores the relative risk of data loss from a subsequent drive loss.

Rather than processing this list in a FIFO order, the intelligent rebuild order selection device examines each rebuild record and creates a relative score for that rebuild record based upon the manner in which the RAID devices are placed on the other drives 320. The rebuild record with the highest relative risk is identified as the rebuild record to be rebuilt next 330 rather than simply according to a FIFO ordering. The identified rebuild record is then rebuilt 340.

In order to calculate the relative risk, a simple count of the number of other drives that can fail can be used to score the drive being rebuilt. The method by which the risk factor is calculated may be modified if the resulting risk factor remains an accurate representation of the risk of data loss. That is, how the number is calculated may be modified as long as it still produces an accurate risk assessment for each drive in the rebuild list. Accordingly, an embodiment of the present invention reduces the risk of data loss if another drive is lost during the rebuild process over the current art.

FIG. 4 illustrates the calculation of risk and intelligent rebuild order selection according to an embodiment of the present invention. In the case of a RAID-5 parity 5 device, there can be as few as four other drives or as many as eight that expose user data on loss of the drives. Obviously, a drive that has an exposure factor of eight should be rebuilt before the drive with an exposure factor of one. In FIG. 4, if any drive has to be rebuilt, the score for that drive would be eight since it participates in a stripe within the RAID with eight other drives. For example, drive 0 is in stripe A with drives 1, 2, 3 and 4. It is in stripe I with drives 7, 8, 9 and 10 for a total of 8 drives.

FIG. 5 illustrates the calculation of risk and intelligent rebuild order selection according to another embodiment of the present invention. In FIG. 5, if any drive had to be rebuilt, the score for that drive would be one since it participates in a stripe within this RAID with only one other drive.

FIG. 6 illustrates the calculation of risk and intelligent rebuild order selection according to yet another embodiment of the present invention. In FIG. 6, a RAID-10 device with a depth of two is shown. In a RAID-10 device with a depth of two, there will be one or two other drives which would present a loss of user data if those drives are lost. For example, in FIG. 6, if dive 0 is lost, drive 0 is in stripe A with drive 2 and is in stripe F with drives 10 for a total of 2 drives.

The process illustrated with reference to FIGS. 1-6 may be tangibly embodied in a computer-readable medium or carrier, e.g. one or more of the fixed and/or removable data storage devices 288 illustrated in FIG. 2, or other data storage or data communications devices. The computer program 290 may be loaded into any of memory 227, 228, 229, to configure any of processors 204, 206, 208 for execution of the computer program 290. The computer program 290 include instructions which, when read and executed by any of processors 204, 206, 208, causes processors processors 204, 206, 208 to perform the operations of an embodiment of the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for providing intelligent rebuild order selection in a storage array, comprising:

examining the interrelationship of data on drives to be rebuilt and any other remaining drives in the system;

calculating a relative score for each rebuild record on a drive to be rebuilt based upon the manner in which the RAID devices are placed on the other remaining drives, wherein the relative score is calculated based only on a count of the number of the remaining drives that can fail;

identifying as the rebuild record to be rebuilt next a rebuild record with a highest relative risk based upon the calculated relative risk score for each rebuild record; and rebuilding the rebuild record having the highest relative risk.

2. The method of claim 1, wherein the calculating the relative score for each rebuild record further comprises counting a number of other drives a stripe in the failed drive participates in.

3. The method of claim 2, where the relative risk score is modified to produces an accurate risk assessment for each rebuild record in a rebuild list.

4. The method of claim 1, wherein the relative risk score is modified to produces an accurate risk assessment for each rebuild record in a rebuild list.

5. A storage system device, comprising:

a processor; and a plurality of storage devices;

wherein the processor is configured for examining the interrelationship of rebuild record on storage devices to be rebuilt and any other remaining storage devices in the system, calculating a relative score for each rebuild record on a drive to be rebuilt based upon the manner in which the RAID storage devices are placed on the other remaining storage devices, wherein the relative score is calculated based only on a count of the number of the remaining drives that can fail, identifying as the rebuild record to be rebuilt next a rebuild record with a highest relative risk based upon the calculated relative risk score for each rebuild record and rebuilding the rebuild record having the highest relative risk.

6. The storage system of claim 5, wherein the processor calculates the relative score for each rebuild record by counting a number of other drives a stripe in the failed drive participates in.

7. The storage system of claim 5, wherein the relative risk score is modified to produces an accurate risk assessment for each rebuild record in a rebuild list.

8. A program storage device, comprising:
program instructions executable by a processing device to perform operations for providing a closed-loop storage system, the operations comprising:
examining the interrelationship of rebuild record to be rebuilt and any other remaining drives in the system;
calculating a relative score for each rebuild record on a drive to be rebuilt based upon the manner in which the RAID devices are placed on the other remaining drives, wherein the relative score is calculated based only on a count of the number of the remaining drives that can fail;
identifying as the rebuild record to be rebuilt next a rebuild record with a highest relative risk based upon the calculated relative risk score for each rebuild record; and
rebuilding the rebuild record having the highest relative risk.

9. The program storage device of claim 8, wherein the calculating the relative score for each rebuild record further comprises counting a number of other drives a stripe in the failed drive participates in.

10. The program storage device of claim 9, wherein the relative risk score is modified to produces an accurate risk assessment for each rebuild record in a rebuild list.

11. The program storage device of claim 8, wherein the relative risk score is modified to produces an accurate risk assessment for each rebuild record in a rebuild list.

* * * * *

UNITED STATES PATENT AND TRADEMARK OFFICE
CERTIFICATE OF CORRECTION

| | |
|---|---|
| PATENT NO. | : 7,305,579 B2 |
| APPLICATION NO. | : 11/086077 |
| DATED | : December 4, 2007 |
| INVENTOR(S) | : Jeffrey Lane Williams |

Page 1 of 1

It is certified that error appears in the above-identified patent and that said Letters Patent is hereby corrected as shown below:

Column 8, Lines 27-28
After "processors" delete "processors".

In Column 8 line 59, Claim 3,
Delete "where" and insert --wherein--, therefor.

Signed and Sealed this

Thirteenth Day of May, 2008

JON W. DUDAS
*Director of the United States Patent and Trademark Office*